United States Patent [19]

Watanabe et al.

[11] 4,356,876
[45] Nov. 2, 1982

[54] PARKING APPARATUS FOR USE ON A THREE-WHEELED MOTORIZED VEHICLE

[75] Inventors: Masaki Watanabe, Urawa; Goroei Wakatsuki, Fujimi; Keiji Suzuki, Tokyo, all of Japan

[73] Assignee: Honda Giken Kogyo Kabushiki Kaisha, Tokyo, Japan

[21] Appl. No.: 137,404

[22] Filed: Apr. 4, 1980

[30] Foreign Application Priority Data

Apr. 5, 1979 [JP] Japan .............................. 54-45085[U]

[51] Int. Cl.³ .......................... B62D 61/08; B62K 5/04
[52] U.S. Cl. ..................................... 180/210; 188/109; 280/282
[58] Field of Search ................... 180/215, 210, 41, 71; 280/282, 111; 188/109

[56] References Cited

U.S. PATENT DOCUMENTS

| 684,053 | 10/1901 | Ford | 188/109 |
| 3,504,934 | 4/1970 | Wallis | 280/282 |
| 3,698,502 | 10/1972 | Patin | 180/215 |
| 3,814,200 | 6/1974 | Hirst | 180/41 |
| 4,006,916 | 2/1977 | Patin | 180/215 X |
| 4,046,211 | 9/1977 | Allen | 180/215 X |

Primary Examiner—John A. Pekar
Attorney, Agent, or Firm—Irving M. Weiner; Pamela S. Burt; John L. Shortley

[57] ABSTRACT

A parking apparatus for a three-wheeled motorized vehicle having one front wheel, two rear wheels, and a front body portion which is transversely swingable relative to a rear body portion. The apparatus comprises a locking mechanism provided between the front and rear vehicle body portions for disabling the front body portion from swinging, a parking brake mechanism operatively cooperating with a normal wheel brake, or alternatively being independent thereof, and a common operating member for operating both the locking and parking brake mechanisms simultaneously.

10 Claims, 17 Drawing Figures

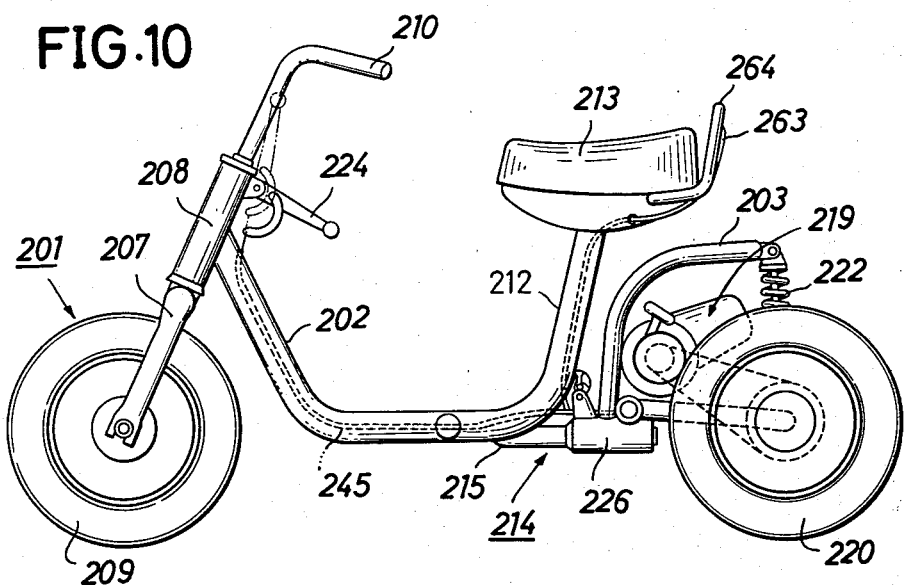
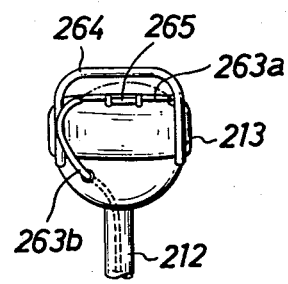
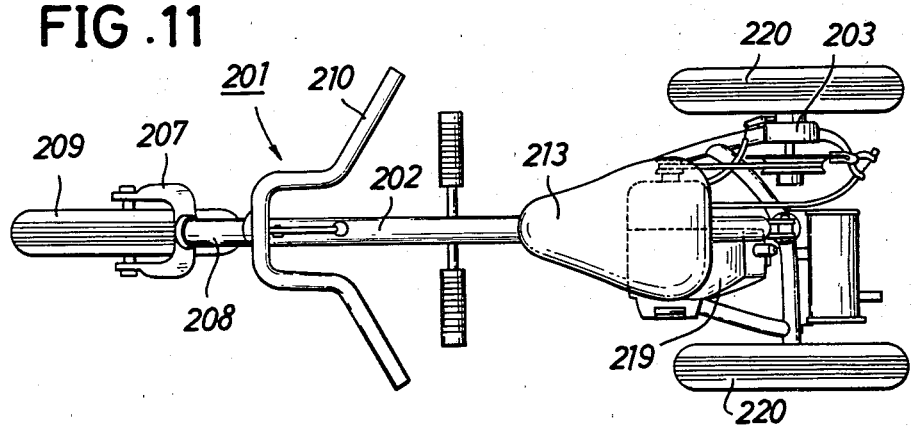

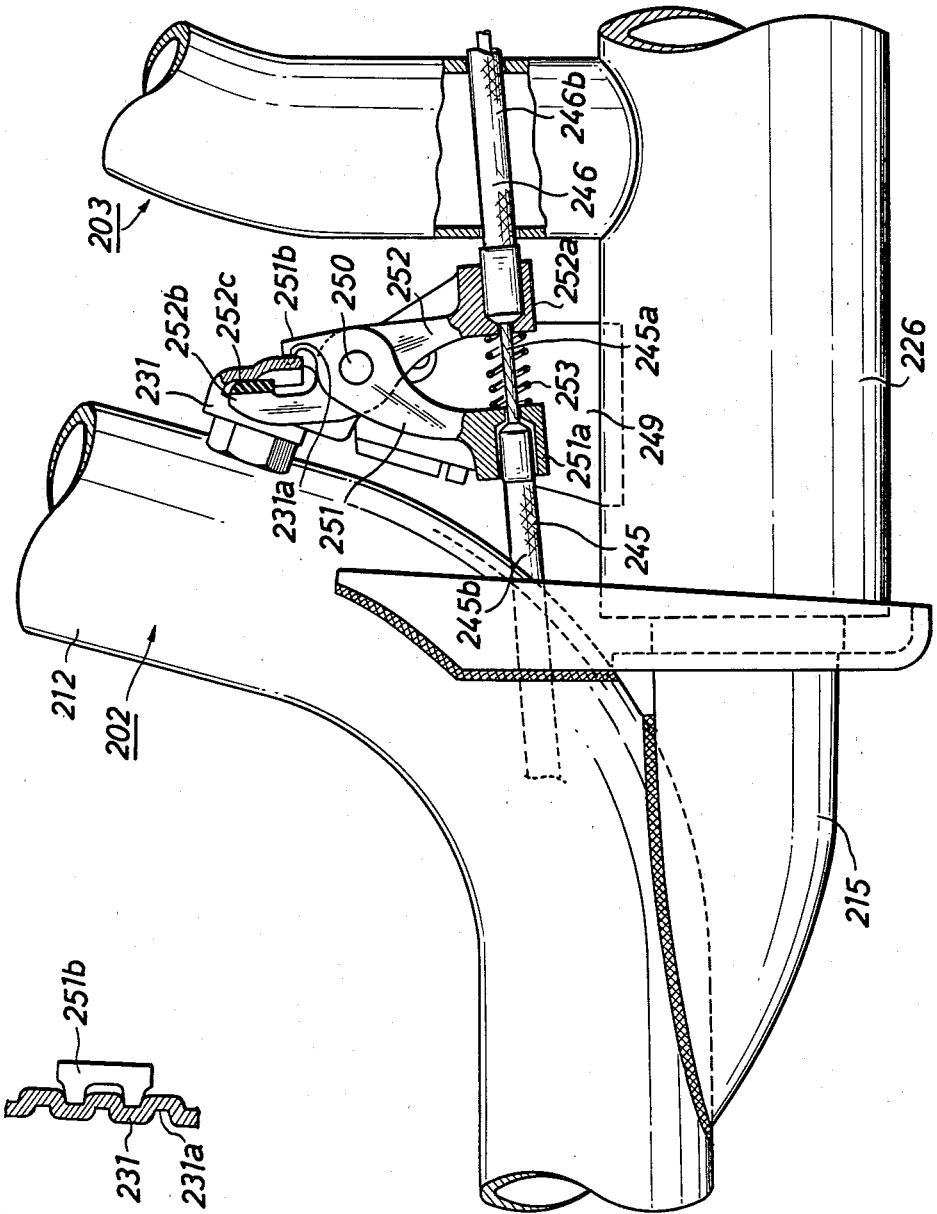

PARKING APPARATUS FOR USE ON A THREE-WHEELED MOTORIZED VEHICLE

BACKGROUND OF THE INVENTION

1. Field of the Invention

The present invention relates to a parking apparatus for use on a three-wheeled motorized vehicle of the type having one front wheel and two rear wheels, and having a front vehicle body portion which is swingable, or pivotably movable, relative to a rear vehicle body portion thereof.

More particularly, the present invention relates to a parking apparatus for use on a three-wheeled motorized vehicle of the aforesaid type, the parking apparatus being adapted for operating by a single action both a parking brake mechanism and a mechanism for diabling the front vehicle body portion from swinging.

The terminology "three-wheeled motorized vehicle" and "vehicle" as employed herein is intended to embrace any one of a variety of types of motorized vehicle apparatus including, generally, a front wheel and two rear wheels. More specifically, such terminology is intended to connote such types of motorized vehicle apparatus having a front vehicle body portion which is swingable, or pivotably movable, relative to a rear vehicle body portion.

2. Description of Relevant Art

A three-wheeled motorized vehicle having one front wheel and two rear wheels is already known, and a relatively small-sized vehicle of such type is also known and commercially available.

In some types of three-wheeled motorized vehicles, a vehicle body is separated into front and rear vehicle body portions, and the front vehicle body portion is swingably connected to the rear vehicle body portion including the rear wheels, such that the front portion may be relatively swingably moved during steering operation while the vehicle is running in order to enable a driver of the vehicle to prevent the vehicle from falling.

A three-wheeled motorized vehicle of the aforesaid type requires a parking brake, much the same as a four-wheeled motorized vehicle, and differs from a two-wheeled motorized vehicle, which may be parked with the front body portion thereof in an inclined position. Such a three-wheeled motorized vehicle further requires a locking mechanism for preventing swinging of the front vehicle body portion relative to the rear vehicle body portion in order to protect the swinging mechanism from damage when the vehicle is in a parked position.

It is possible in this connection to separately provide the parking brake mechanism and the mechanism for locking the front vehicle body portion against swinging, however, because such mechanisms must be operated separately, the operational complexity is doubled, and it is likely that one of the mechanisms may fail to be operated. Even if both mechanisms are properly actuated, release thereof will again require a two-fold operation, and the complexity involved is very likely to result in failure of one of the mechanisms to be released. A particularly serious and dangerous problem may arise if the vehicle is driven without releasing the locking mechanism, primarily because the front vehicle portion will not swing when it is desired to turn the vehicle.

The present invention is directed toward effectively solving the above-described problems attendant a three-wheeled motorized vehicle provided with a parking brake and a mechanism for locking the front vehicle body portion against undesirable swinging.

SUMMARY OF THE INVENTION

It is an object of the present invention to provide, in a three-wheeled motorized vehicle having a swingable front vehicle body portion relative to a rear vehicle body portion, a parking apparatus which requires only a single operating member to simultaneously actuate or release both a parking brake mechanism for locking the wheels and a mechanism for locking the front vehicle body portion relative to the rear vehicle body portion.

In accordance with the present invention, therefore, it is possible to obtain a parking apparatus which ensures functioning of both of the aforesaid mechanisms in a three-wheeled motorized vehicle by a single action, while eliminating any possible operational failure, so that operability and safety of the vehicle may be improved.

It is another object of the present invention to provide a parking apparatus, for use in a three-wheeled motorized vehicle, having an operating member mounted under the seat so that no extra space is required for installation thereof, and which may be easily handled without interfering with the driving operation of the vehicle.

It is a further object of the present invention to provide a parking apparatus for use in a three-wheeled motorized vehicle which includes a neutral mechanism operatively associated with the parking brake mechanism to temporarily release same, while the swinging locking mechanism is maintained in its operative position, to permit movement of the vehicle over a short distance without resort to any cumbersome releasing and re-actuating operations of the locking mechanism, the neutral mechanism having an operating member provided on a grip portion behind the seat to enable it to be easily manipulated.

Other objects and advantages of the present invention will become apparent from the following detailed description of preferred embodiments of the invention, when read in conjunction with the accompanying drawings.

BRIEF DESCRIPTION OF THE DRAWINGS

FIG. 10 is a side elevational view outlining a different type of three-wheeled motorized vehicle.

FIG. 11 is a top plan view of the motorized vehicle shown in FIG. 10.

FIG. 12 is a fragmentary view of the FIG. 10 structure, taken from behind the seat.

FIG. 13 is a fragmentary enlarged side elvational view of the motorized vehicle shown in FIG. 10, showing the locking mechanism partially in section.

FIG. 14 is a fragmentary top plan view of the locking arrangement shown in FIG. 13.

DETAILED DESCRIPTION OF PREFERRED EMBODIMENTS

Figure 1:
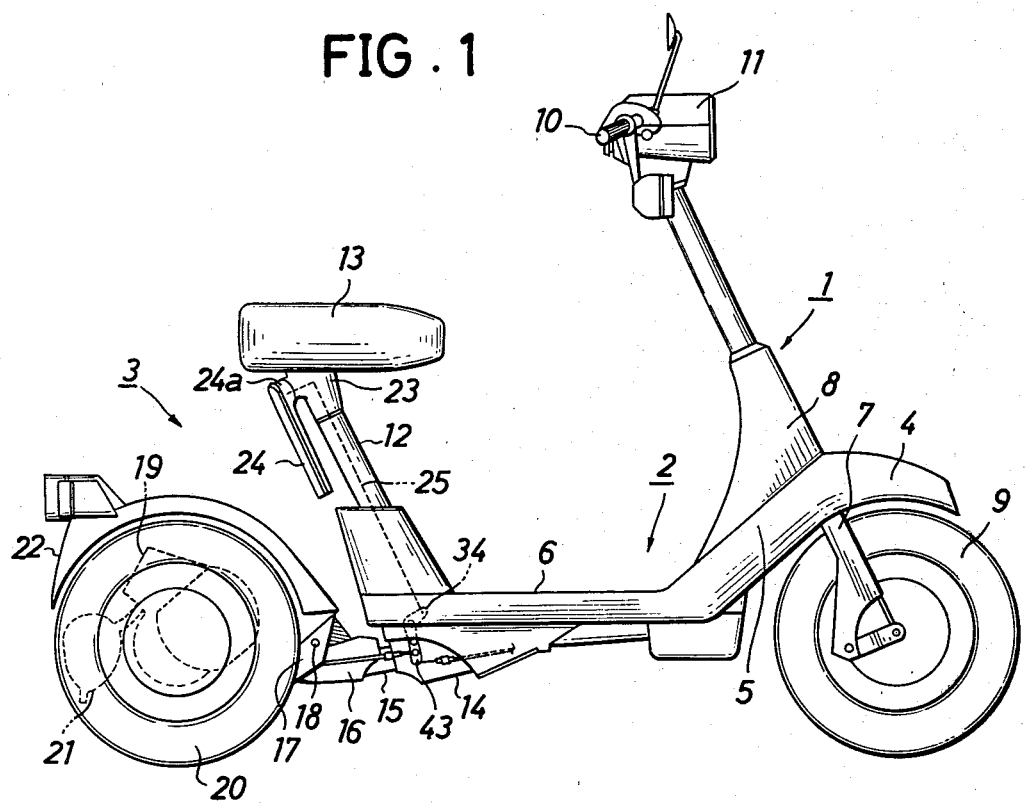
FIG. 1 is an overall side elevational view showing an exemplary three-wheeled motorized vehicle to which the present invention is applied.
Figure 2:
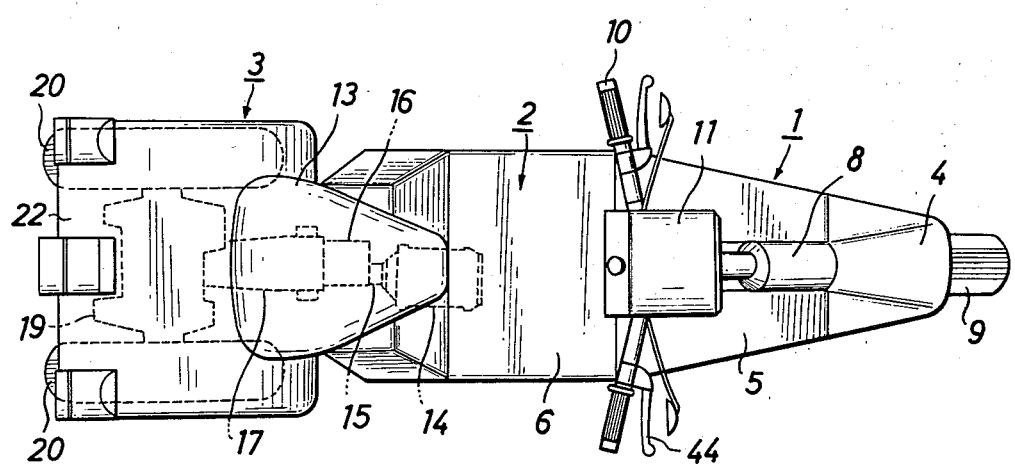
FIG. 2 is a top plan view of the motorized vehicle shown in FIG. 1.

FIGS. 1 and 2 generally show a three-wheeled motorized vehicle 1 which comprises a front vehicle body portion 2 and a rear vehicle body portion 3. The front body portion 2, having a low-floored construction, comprises: a front fender 4 at its forwardmost end; a downwardly and rearwardly inclined front portion 5 behind the front fender 4; and a floor portion 6 extending in a substantially flat low plane from the rear end of the inclined portion 5. The floor portion 6 has a width sufficient to permit the feet of the driver to be positioned thereon.

A supporting post 8 for a front fork 7 extends upwardly from the front portion 5, and the front fork 7 extending through the supporting post 8 has a lowermost end on which a steerable front wheel 9 is supported. The front fork 7 also has a portion extending upwardly from the post 8, such portion having a handle-bar 10 mounted at its upper end, at which a case 11 is provided for holding a headlight and instruments therein. The front body portion 2 also has a rear end provided at the center thereof with an upwardly extending seat post 12 having a hollow cylindrical or similar construction and supporting a driver's seat 13 at the upper end thereof.

A coupling 14 is provided at the rear end of the front body portion 2 on the underside thereof, and a swinging shaft 15 extending rearwardly from the coupling 14 has a rear end to which the rear subframe 16 of the rear body portion 3 is connected. A rear fork 17 is pivotably connected to the frame 16 about a pin 18, and has mounted thereon a driving unit 19 including an engine and a transmission. The driving unit 19 is disposed between a pair of rear driving wheels 20, and is connected thereto. In the embodiment shown, the driving unit 19 is confined within an area defined by a contoured space surrounding the rear wheels 20. A rear fender 22 extends over the driving unit 19 and the rear wheels 20.

In the three-wheeled motor vehicle 1 described hereinabove, a holder 23 is received over the seat post 12 immediately below the seat 13, and is provided with an operating lever 24. The operating lever 24 is rotatably connected to the holder 23 at its upper end 24a, and is inoperative when it extends downwardly so as to be substantially parallel to the holder 23, as shown in FIG. 1. The lever 24 is rotatable about its upper end 24a, in the clockwise direction of FIG. 1, to its raised operative position, at which a parking brake mechanism and a mechanism for locking the front body portion against swinging are actuated. The upper end of the lever 24 is connected to the upper end of an operating rod 25 extending longitudinally through the seat post 12 and the holder 23, the rod 25 having a lower end extending downwardly to the coupling 14.

FIGS. 3 through 6 comprise enlarged views showing the coupling, including the parking brake mechanism and the swing locking mechanism.

The swinging shaft 15 secured to the front end of the rear subframe 16 in the rear vehicle body portion 3 has its front and middle portions supported by bearings 27 and 28 in a case 26 secured to the rear end of the front vehicle body portion 2 on the underside thereof, so that the front vehicle body portion 2, including the case 26, may be swung about the fixed end of the shaft 15. A bulging member 29 is connected about the front portion of the shaft 15 in the case 26, and a rubber member 30 is interposed between the inner wall of the case 26 and the outer periphery of the bulging member 29. In this manner, there is formed a so-called "Neidhart cushion" to function as a mechanism for restoring or returning the front vehicle body portion when it is swung or pivoted during steering operations.

Figure 6:
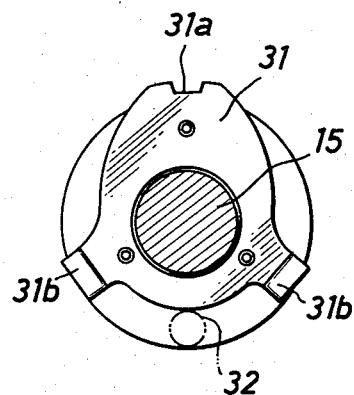
FIG. 6 is an end view, partially in section, of the lock plate portion of the mechanism shown in FIGS. 4 and 5.
Figure 8:
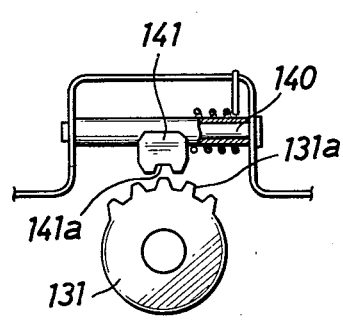
FIG. 8 is a view taken in the direction of arrow 8 in FIG. 7.

A lock plate 31 is secured about the middle portion of the shaft 15 in the case 26, and is provided with a locking recess 31a at its upper end, and a pair of symmetrically disposed restraining projections 31b at its lower end, as shown in FIG. 6. The case 26 is provided with a stop member 32 which is normally disposed substantially halfway between the restraining projections 31b, and which is contacted by either of the restraining projections 31b upon swinging movement of case 26. In this manner, the projections 31b and stop member 32 operatively cooperate to thereby define the limits within which the front vehicle body portion 2 is swingable about shaft 15.

The case 26 is formed at its rear end with an upwardly protruding portion 26a defining therein a hollow space across which an operating shaft 33 is transversely mounted. The shaft 33 has one end which projects outwardly from the protruding portion 26a, and to which an L-shaped operating link 34 is secured. A return spring 35 is disposed around the outer surface of the protruding portion 26a surrounding the shaft 33, and has one end thereof engaged with the link 34. The link 34 has one end 34a connected to the lower end of the operating rod 25 by a spring 36. A release sleeve 37 is splined or otherwise fitted about the operating shaft 33 in the protruding portion 26a. A pushing member 38 is rotatably fitted about the middle portion of the sleeve 37 with which one end of a release spring 39 is engaged, and engages the other end of the release spring 39. A supporting shaft 40 is disposed between the shafts 15 and 33, and supports the base end of a locking pawl 41 which is normally urged by a return spring 42 toward its disengaged position. The pawl 41 is provided at its free end with a tongue 41a disposed opposite the locking recess 31a of lock plate 31 in its normal position. The pawl 41 has a rear surface defining a cam portion 41b located opposite to a push end 38a of the pushing member 38.

Figure 3:
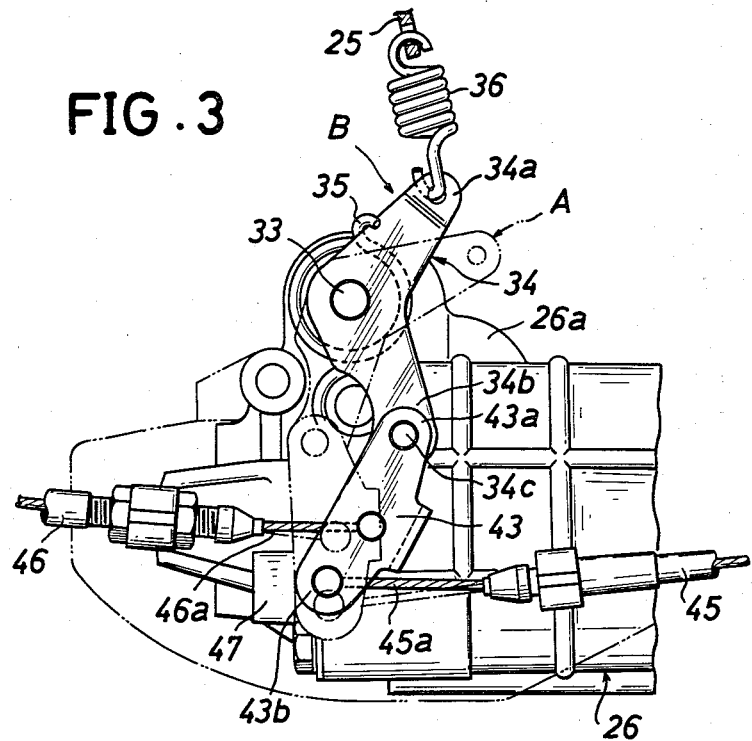
FIG. 3 is an outline view of the parking mechanism in accordance with the invention.
Figure 4:
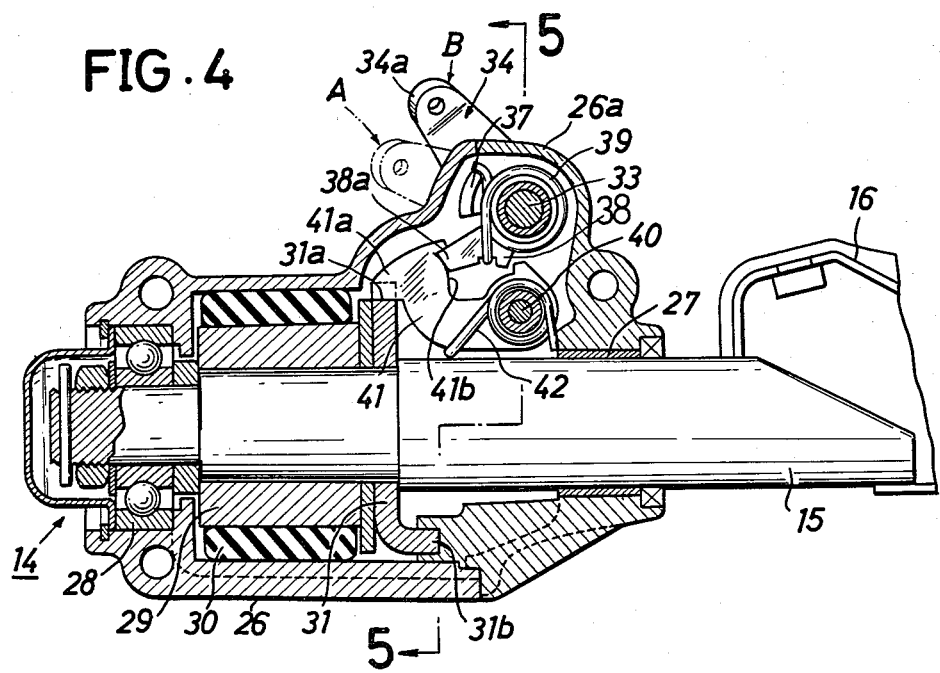
FIG. 4 is a longitudinal sectional view of the parking mechanism shown in FIG. 3.
Figure 5:
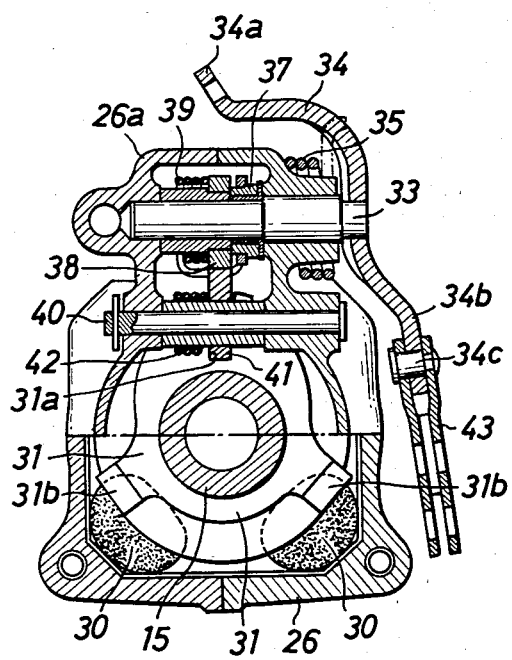
FIG. 5 is a transverse sectional view taken along line 5—5 in FIG. 4.

The chain line A in FIGS. 3 and 4 shows the operating link 34 in its inoperative position. If the lever 24 is raised when the vehicle is in a parked condition, the rod 25 is pulled, and the link 34 is rotated by the spring 36 into its operative position B shown by a solid line in FIGS. 3 and 4. The shaft 33 is rotated a predetermined angular amount in a clockwise direction as viewed in FIG. 4, the pushing member 38 is rotated by the release spring 39, and the cam portion 41b of pawl 41 is pushed by the push end 38a, such that pawl 41 is rotated about shaft 40 in the counterclockwise direction of FIG. 4 by overcoming the force of spring 42. Consequently, the tongue 41a engages the locking recess 31a in the lock plate 31 on the shaft 15 connected to the rear vehicle body portion 3. This position of the mechanism is shown in FIG. 4, wherein the engagement of pawl 41 provided in the swingable front vehicle body portion 2 with the lock plate 31 in the stationary rear body portion 3 locks the front vehicle body portion 2 against swinging.

Because pushing member 38 is adapted for rotation by the force of release spring 39, pawl 41 is urged into contact with the outer periphery of lock plate 31 even if it fails to properly engage the locking recess 31a in the lock plate 31. Therefore, if the front vehicle body portion 2 is swung into its normal position, the tongue 41a is brought into proper engagement with the recess 31a, thereby locking the front vehicle body portion 2 against any further swinging motion.

A parking brake actuating member in the form of a brake link 43 is rotatably connected at one end 43a thereof to the other end 34b of operating link 34 by a pin 34c, while the other end 43b of link 43 is connected to the inner part 45a of a brake cable 45 leading to a rear brake lever 44 (FIG. 2) on the handlebar 10. A mid-portion of link 43 is connected to the inner part 46a of a rear brake cable 46 for braking the rear wheels 20. A stop member 47 is provided on the side of case 26, and behind the lower end 43b of link 43, and is in contact with the rear face of the end 43b of link 43. Upon operation of brake lever 44, the cable inner part 45a is pulled, and the link 43 is rotated in the counterclockwise direction in FIG. 3 about the pin 34c at the end 43a, so that cable inner part 46a leading to the brake on the rear wheels 20 is pulled to the right in FIG. 3, so as to thereby perform the normal braking function.

Upon operation of operating lever 24, the operating link 34 is rotated upwardly into its operative position B, whereby the swinging mechanism is locked as described hereinabove, and because the lower end 43b of link 43 is retained against stop member 47, the counterclockwise rotation of lower end 34b of link 34 causes rotation of link 43 in a clockwise direction about its lower end 43b in FIG. 3, whereby the cable inner part 46a is pulled to the right in FIG. 3. Thus, the normal braking function as well as the function of a parking brake, is performed by the existing rear brake. Such operation is shown in FIG. 3.

As described hereinabove, a single action of moving lever 24 operates the parking brake, and also locks the front vehicle body portion against swinging relative to the rear body portion. In this manner, separate operation of the parking brake and the locking mechanism is eliminated and a single simplified action is all that is required to activate both mechanisms simultaneously. Moreover, a single operating system provides an interlocking mechanism for performing the aforementioned action in the area where the front vehicle body portion is swingably connected to the rear body portion. Thus, even if the locking mechanism is not properly actuated after the foregoing procedures for the locking operation have been properly followed, the properly locked position can be obtained if the front vehicle body portion 2 is appropriately swung again.

Figure 9:
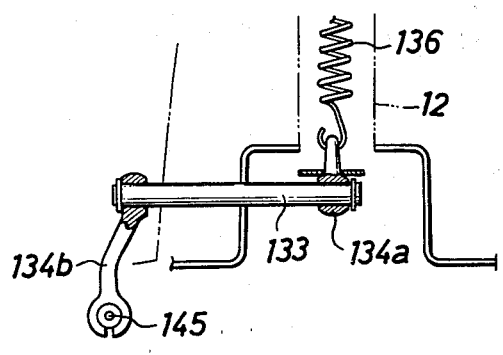
FIG. 9 is a view taken in the direction of arrow 9 in FIG. 7.
Figure 7:
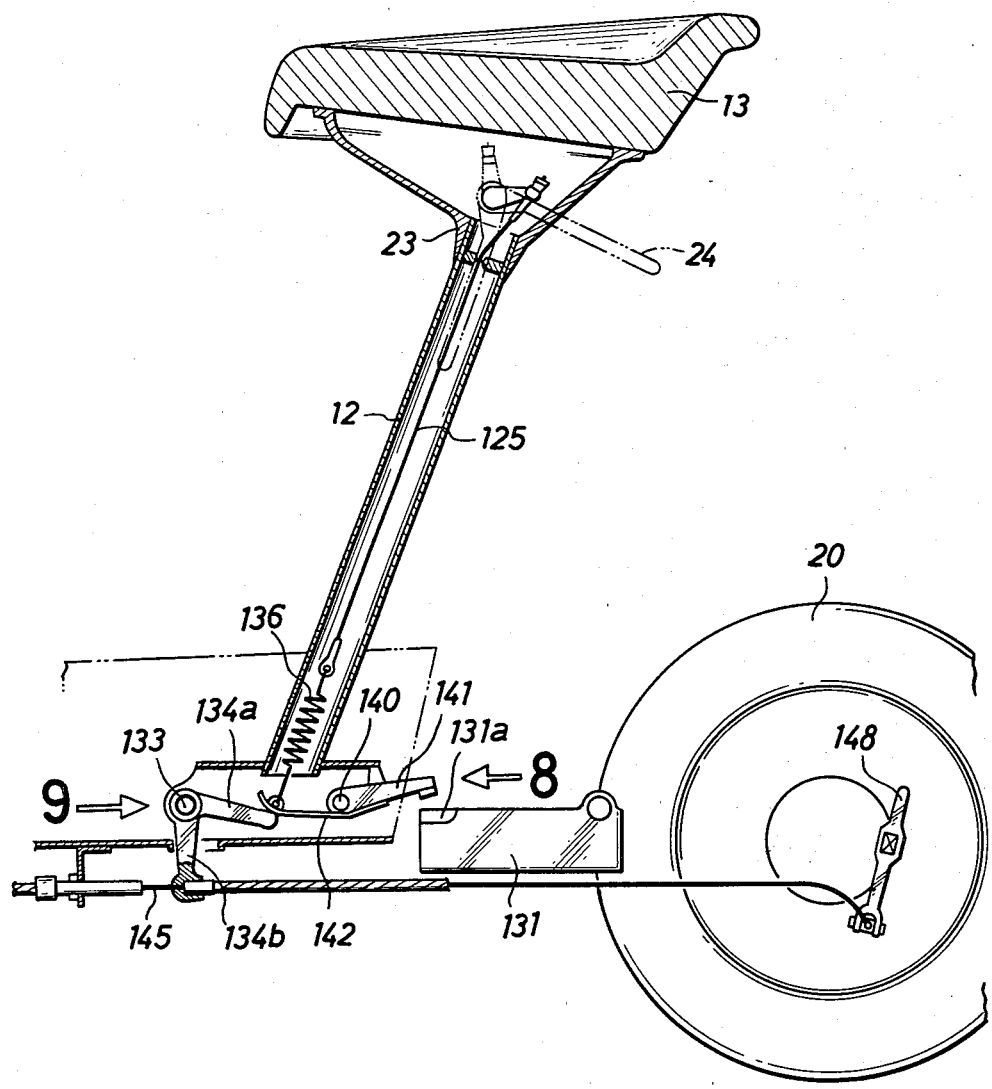
FIG. 7 is a fragmentary view schematically showing a modified form of the present invention.

With reference to FIGS. 7 and 9, there is shown a second embodiment of the present invention.

A lever 24 provided on a holder 23 for a seat 13 is operably associated by a cable 125 and a spring 136 with a link 134a rotatably supported on a pin 133, while another link 134b is also supported on pin 133 and the lower end thereof is spaced apart from link 134a so as to define a substantially L-shaped linkage therewith, clockwise rotation of link 134b being prevented by the vehicle frame. Such lower end of link 134b freely receives therethrough a midportion of an inner rear brake cable part 145 connecting a rear brake 148 and a brake lever on a handlebar of the vehicle, and is fastened to the outer cable part. A member 131 for restraining the swinging of the front vehicle body portion 2 is provided in the rear vehicle body portion 3, and may, for example, comprise a swinging shaft as described hereinabove; or a rear subframe; or, if a coupling is provided in the rear vehicle body portion, the outer portion thereof. The restraining member 131 is formed at its front end with a plurality of locking teeth 131a, and a locking arm 141 facing the teeth 131a is provided in the front vehicle body portion. The arm 141 has a base end rotatably supported on a pin 140, and has a free end formed with a locking recess 141a which is engageable with any of the teeth 131a. One end of a leaf spring 142 is secured to the underside of locking arm 141, while the other end of spring 142 is connected to link 134a.

Upon operation of the rear brake lever on the handlebar, the end of inner cable part 145 is pulled, and the brake 148 is operated. Neither the link 134b nor the link 134a will move, however, the normal braking operation is performed.

If the operating lever 24 is raised, the link 134a is rotated upwardly (counterclockwise) by the cable 125 and the spring 136, and simultaneously, the other link 134b is rotated in the same counterclockwise direction to provide a braking effect by moving the cable outer part to the right in FIG. 7. That end of spring 142 to which link 134a is fastened is rotated upwardly, and the locking arm 141 is rotated in a clockwise direction so as to engage its locking recess 141a with one of the teeth 131a in the rear vehicle body portion, whereby the front vehicle body portion is locked against swinging. The spring 142 functions as a relief spring in much the same manner as in the foregoing embodiment described hereinabove.

With reference now to FIGS. 10 through 17, there is shown a third embodiment of the present invention.

According to the embodiment of FIGS. 10 through 17, a three-wheeled motorized vehicle 201 has a front vehicle body portion 202 having a tubular construction extending rearwardly from a head tube 208, and having an upwardly extending rear portion defining a seat post 212 on which a seat 213 is mounted. A front fork 207 extends longitudinally through the head tube 208, and has a lower end on which a steerable front road wheel 209 is supported, while a handlebar 210 is connected to the upper end of front fork 207. A rear vehicle body portion 203 is also constructed of a combination of tubular materials, and carries a driving unit 219, a pair of rear wheels 220 driven by a belt and pulley assembly, and a rear cushion or shock absorbing unit 222. The rear vehicle body portion 203 is provided with a coupling 214 at the bottom of its front end, and a shaft 215 extending from the coupling 214 is connected to the front vehicle body portion 202, while a case 226 is connected to the rear vehicle body portion 203, whereby the front vehicle body portion 202 is transversely swingable relative to the rear body portion 203 about the shaft 215.

As clearly shown in FIG. 13, a bracket 249 extends upwardly from the case 226 in the rear vehicle body portion 203, and carries a pair of calipers 251 and 252 which are rotatable toward and away from each other about a pin 250, the respective lower ends 251a and 252a thereof being engaged with the facing ends of a pair of parking brake cables 245 and 246, respectively. The inner part 245a of the cable 245 is movable independently of its outer part 245b, but together with the outer part 246b of the other cable 246. A return spring 253 encircling the cable inner part 245a is disposed between the lower ends 251a and 242a of the calipers 251 and 252, respectively, and urges the calipers 251 and 252 away from each other. One caliper 251 has an upper end extending above the pin 250 and formed with a projection 251b while the other caliper 252 has a flat upper end 252b provided thereon with a cushioning member 252c.

Figure 15:
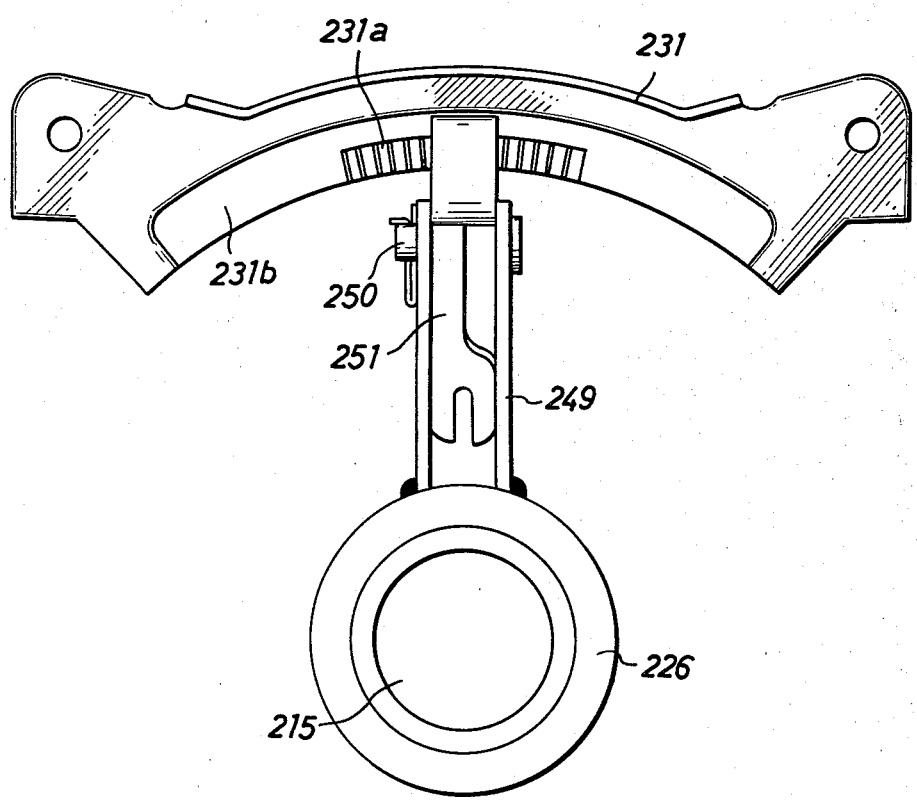
FIG. 15 is a front elevational view of the locking mechanism.
Figure 17:
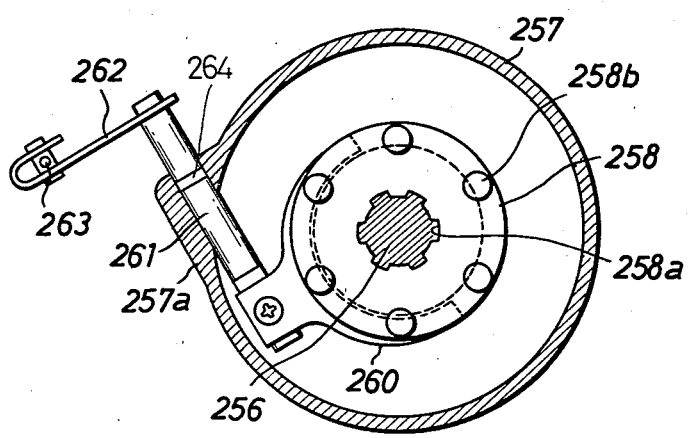
FIG. 17 is an end view, partially in section, of a neutral mechanism.

The front vehicle body portion 202 is provided at the bottom of its rear end with a fixed lock plate 231 having a plurality of radially concavo-convex teeth 231a as shown in FIG. 15. That area 231b of the lock plate 231 in which the teeth 231a are formed is so positioned relative to the calipers 251 and 252 that the respective upper ends 251b and 252b of the calipers 251 and 252 are normally kept away from contact therewith.

Figure 16:
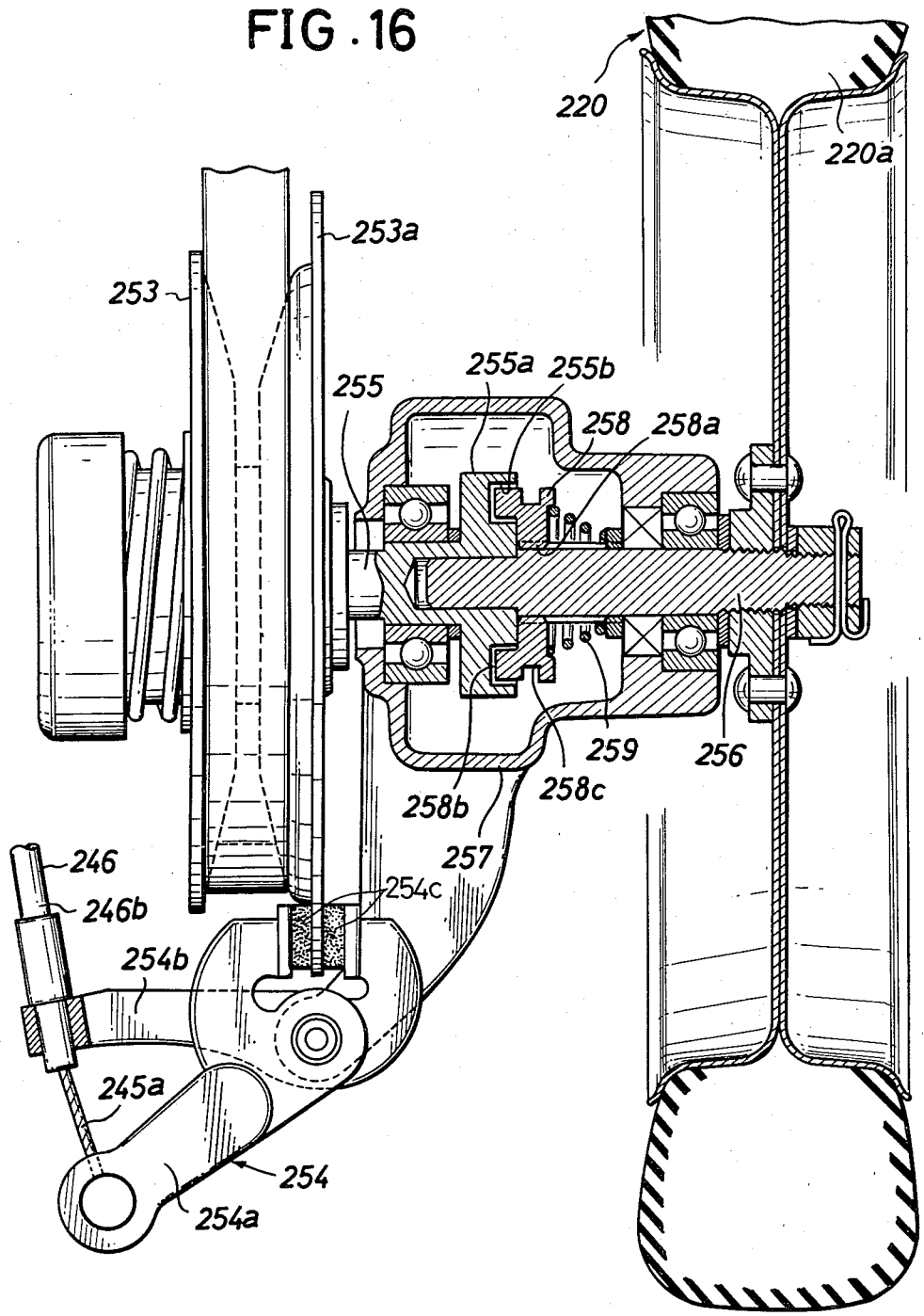
FIG. 16 is a longitudinal sectional view of an axle portion including a parking brake.

In FIG. 16, the inner part 245a extending through the parking cable 246 and connected integrally therewith extends rearwardly, and is engaged with one of the calipers 254a and 254b in a discbrake type parking brake unit 254 provided adjacent a flange 253a on a pulley 253 for driving one of the rear wheels 220 indicated at 220a. Brake pads 254c facing the opposite sides of the flange 253a are provided on the calipers 254a and 254b at their ends remote from the cable inner part 245a.

The cable 245, which extends forwardly through the pipe defining the front vehicle body portion 202, terminates in the region of the head tube 208, and the end of the inner part 245a is connected to the base end of an operating lever 224 rotatably supported on the head tube 208 (FIG. 10).

If the operating lever 224 is raised, the cable inner part 245a is pulled, and the calipers 251 and 252 are rotated toward each other. Consequently, the teeth 231a on the lock plate 231 are clasped between the projection 251b on one caliper 251 and the cushioning member 252c on the upper end 252b of the other caliper 252, whereby the lock plate 231 and the calipers 251 and 252 are engaged with each other to lock the front vehicle body portion 202 against swinging relative to the rear body portion 203. Simultaneously, the cable pulls the caliper 254 under pressure, and presses the brake pads 254c against the flange 253a on the pulley 253, whereby the parking brake is operated. FIGS. 13 through 16 show such operation. Thus, a single action effects both the locking of the front vehicle body portion against swinging, and the operation of the parking brake, simultaneously.

In some situations it may be desired to move the three-wheeled motorized vehicle a short distance, such as in a garage or elsewhere after the front vehicle body portion has been locked against swinging, and the parking brake engaged. The structural arrangements and operation described hereinabove do not permit any such limited movement, unless the operating lever 224 is released. To overcome such limitation, there is further provided the following feature in accordance with the present invention.

One end of an axle 256 is slidably connected to an output shaft 255 of the pulley 253. The output shaft 255 extends into a housing 257, and is provided at its end with a flange 255a defining one-half of a dog clutch. The flange 255a has an end surface formed with concavities 255b. A shifter 258, which is formed with projections 258b engageable with the concavities 255b, is splined about the axle 256 at 258a. The shifter 258 is rotatable in the same direction with the axle 256, while it is axially slidable along the axle 256, and is normally urged by a spring 259 into engagement with the flange 255a, thereby defining a dog clutch therewith. Normally, therefore, the shifter 258 is effectively connected with the output shaft 255 as shown in FIG. 16, such that the output of pulley 253 is transmitted to axle 256.

The shifter 258 is formed with a groove 258c along its outer periphery, and a C-shaped shift arm 260 is fitted in the groove 258c. The shift arm 260 has a base end connected to one end of a neutral lever shaft 261. The shaft 261 has a mid-portion extending outwardly through a boss 257a on the housing 257, and supported pivotally at 264 in the boss 257a. A neutral lever 262 is secured to the other end of the shaft 261 which is disposed outwardly of the housing 257. The lever 262 has a free end connected to one end of the inner part of a neutral operating cable 263.

As shown in FIG. 12, a carrier handle 264 is provided behind the seat 213, and a portion of the inner part 263a of the operating cable 263 is exposed under the carrier handle 264 substantially in parallel therewith. The end of the inner part 263a is connected to the handle 264, while the end of an outer part 263b is also secured to the handle 264, and they extend through the seat post 212 to the lever 262. That portion of the inner part 263a which is parallel to the handle 264 is provided midway with a grip 265 which affords convenient holding of the cable.

In the arrangement as described hereinabove, the shifter 258 is normally urged into clutch engagement by the spring 259, and keeps the shift arm 260 pulled in the direction in which the shifter 258 is urged. The shift arm 260 in turn keeps the cable inner part 263a pulled via the shaft 261 and the lever 262, so that the exposed end portion of the cable inner part 263a remains parallel to the horizontal portion of handle 264 as shown in FIG. 12.

If it is now desired to move the vehicle after the front vehicle body portion is locked against swinging, and the parking brake engaged, it is sufficient to hold the grip 265 under the handle 264 with the horizontal portion of the latter and raise the grip 265 as shown by chain line in FIG. 12. As a result, the cable inner part 263a is pulled upwardly, and the lever 262 is rotated to rotate the shift arm 260 via shaft 261 to move shifter 258 away from flange 255a along the axle 256 by overcoming the force of spring 259, whereby the rotatable connection between output shaft 255 and axle 256 is severed. Consequently, the rear wheels 220 will then be freely movable, thereby permitting easy movement of the vehicle even after its front vehicle body portion has been locked, and the parking brake engaged. After the vehicle has been moved as required, the grip 265 is released, and the shifter 258 is thereby sprung back into clutch engagement with the flange 255a to restore the operative position of the parking brake. Because the grip for effecting the neutral operation is provided proximal the carrier handle behind the seat, the carrier handle for movement of the vehicle and the grip for neutral operation can easily be grasped together. Such feature renders it very easy to handle the vehicle when parking operations are being performed.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A parking apparatus for a three-wheeled motorized vehicle having one front wheel, two rear wheels, and substantially separate front and rear vehicle body portions, the front body portion being transversely swingable about a shaft relative to the rear body portion, said apparatus comprising:
   a locking mechanism disposed between said front and rear vehicle body portions for disabling said front body portion from swinging;
   a parking brake mechanism operably connected with a brake for said wheels;
   means for operating, in common, both said locking mechanism and said parking brake mechanism;
   said shaft comprising a stationary shaft secured in said rear body portion;
   said locking mechanism comprising a lock plate secured to said shaft;
   a case surrounding said shaft;
   a pawl member provided in said case and normally urged to an inoperative position thereof;
   a linkage adapted for bringing said pawl member into operative engagement with said lock plate; and
   brake cables connected to said linkage, said linkage being rotatable by said operating member into its operative position to move said pawl member and said brake cables into the respective operative positions thereof.

2. A parking apparatus according to claim 1, further comprising:
   a pushing member disposed between said pawl member and said linkage, said pushing member being operatively associated with said linkage so as to urge said pawl member into its operative position upon rotation of said linkage.

3. A parking apparatus according to claim 1, wherein:
   said brake cables comprise a first cable connected to a brake operating member and a second cable connected to a brake unit; and
   said linkage comprises:
      an operating link which is rotatable so as to bring said pawl member into its operative position; and
      a brake operating link having one end rotatably connected to said operating link and another end restrained against movement in one direction, said other end being connected to said first cable, and a mid-portion of said brake operating link being connected to said second cable.

4. A parking apparatus for a three-wheeled motorized vehicle having one front wheel, two rear wheels, and substantially separate front and rear vehicle body portions, the front body portion being transversely swingable about a shaft relative to the rear body portion, said apparatus comprising:
   a locking mechanism disposed between said front and rear vehicle body portions for disabling said front body portion from swinging;
   a parking brake mechanism operably connected with a brake for said wheels;
   means for operating, in common, both said locking mechanism and said parking brake mechanism;
   said locking mechanism comprising a first link and a second link which are supported on a shaft in a substantially L-shaped configuration, said first link being connected to said operating member, and said second link being connected to a mid-portion of a brake cable and being rotatable about said shaft upon rotation of said shaft so as to bring said first link to its operative position upon movement of said brake cable;
   a restraining means in said rear body portion; and
   a locking arm operatively connected with said first link for engagement with said restraining means to lock said front body portion against swinging.

5. A parking apparatus according to claim 4, further comprising:
   a spring by which said first link and said locking arm are connected with each other.

6. A parking apparatus according to claim 1 or 4, wherein:
   said operating means is disposed under a driver's seat of said vehicle; and
   said operating means is connected to said locking mechanism by a linear element which is pulled or pushed by said operating means to bring said locking mechanism into its operative position for locking said front body portion.

7. A parking apparatus for a three-wheeled motorized vehicle having one front wheel, two rear wheels, and substantially separate front and rear vehicle body portions, the front body portion being transversely swingable about a shaft relative to the rear body portion, said apparatus comprising:
   a locking mechanism disposed between said front and rear vehicle body portions for disabling said front body portion from swinging;
   a parking brake mechanism operably connected with a brake for said wheels;
   means for operating, in common, both said locking mechanism and said parking brake mechanism;
   a clutch mechanism normally operatively connecting one of said rear wheels, for which said parking brake mechanism is provided, with an output shaft of a driving unit arrangement;
   operating means for releasing said clutch mechanism, said clutch operating means being mounted on said vehicle so as to be accessible for operation by a user; and
   said axle being released from said clutch mechanism upon operation of said clutch releasing operating means to permit free movement of said rear wheels even when said locking mechanism and said parking brake mechanism have been moved to the operative positions thereof via said common operating means.

8. A parking apparatus according to claim 7, wherein said locking mechanism comprises:
   a lock plate secured in one of said front and rear body portions in the vicinity of the area where said front body portion is swingably connected to said rear body portion; and
   a pair of calipers rotatably supported in the other of said front or rear body portions and adapted for holding said lock plate therebetween at one end thereof, one of said calipers being connected to a brake cable for movement therewith to hold said lock plate between said calipers upon movement of said brake cable in a direction which actuates the brake.

9. A parking apparatus according to claim 7, wherein: said operating means for said clutch mechanism is provided behind a seat of said vehicle in close proximity to a carrier handle, said operating means being supported at portions thereof by said carrier handle.

10. A parking apparatus for a three-wheeled motorized vehicle having one front wheel, two rear wheels, and substantially separate front and rear vehicle body portions, the front body portion being transversely swingable about a shaft relative to the rear body portion, said apparatus comprising:
- a locking mechanism disposed between said front and rear vehicle body portions for disabling said front body portion from swinging transversely relative to said rear body portion;
- a parking brake mechanism operably connected with a brake for said vehicle;
- a single operating member operatively cooperating with said locking mechanism and said parking brake mechanism so as to operate, in common, both said locking mechanism and said parking brake mechanism;
- said single operating member being disposed under a driver's seat of said vehicle and extending substantially parallel to a seat post upon which said seat is mounted; and
- said operating member comprising an operating rod extending substantially through said seat post and having an operating lever connected to the upper end thereof under said driver's seat.

* * * * *